6.6 X

50 X

INVENTORS
THOMAS J. ENRIGHT
WILLIAM F. SHARP, JR.

ATTORNEY

United States Patent Office 3,583,062
Patented June 8, 1971

3,583,062
EXPLOSION BONDING OF ALUMINUM
TO STEEL
William F. Sharp, Jr., Bellmawr, and Thomas J. Enright, Woodbury Heights, N.J., assignors to E. I. du Pont de Nemours and Company, Wilmington, Del.
Continuation-in-part of abandoned application Ser. No. 695,506, Jan. 3, 1968. This application July 30, 1968, Ser. No. 756,704
Int. Cl. B23k 21/00
U.S. Cl. 29—470.1
8 Claims

ABSTRACT OF THE DISCLOSURE

Composite products of certain aluminum and steel layers metallurgically bonded together over at least 90% of their interface by a substantially diffusionless wavy bond containing, by area, at least about 70% direct aluminum-to-steel bonding are prepared by an improved explosion-bonding process wherein at least one layer of aluminum is caused to collide progressively with a layer of steel at a velocity of about from 2500 to 3400 meters/sec. and at an impact angle of about from 14 to 25°, the opposed surfaces of said layers being disposed at an angle of less than 5° prior to detonation of said explosive.

CROSS-REFERENCE TO RELATED APPLICATION

This application is a continuation-in-part of our prior copending application Ser. No. 695,506, filed Jan. 3, 1968, now abandoned.

BACKGROUND OF THE INVENTION

U.S. Pats. 3,137,937 and 3,264,731 describe processes for producing metallurgically bonded clad products by means of explosives. According to the processes described, the metal layers to be metallurgically bonded are propelled together with an explosive so as to cause them to collide progressively at a velocity which is below 120%, and preferably below 100%, of the sonic velocity of the metal in the cladding system having the highest sonic velocity. The metal layers initially are spaced from each other at an angle, usually less than 40°, and preferably about 0° (i.e., they are substantially parallel) and a layer of detonating explosive is positioned adjacent the outer surface of at least one of the layers and then initiated so as to cause the required progressive collision.

Three types of bond zones, each completely metallurgical, may result from the above processes: direct metal-to-metal, uniform melted layer, or a mixture of these arranged in a wave pattern. "Direct metal-to-metal" means that the metals are bonded together at their adjoining surfaces to form an interface without the intervention of a layer of solidified melt therebetween. The "uniform melted layer" type of bond zone is that in which the metals are bonded together via an intervening layer of solidified melt of substantially homogeneous composition, forming substantially two interfaces. As seen in a cross-sectional view taken normal to the interface and parallel to the direction of detonation, the wave pattern type of bond zone is composed of periodically spaced discrete regions of solidified melt between areas of direct metal-to-metal bond. This means that at the bond zone there is one interface, i.e., metal-to-metal, in the areas where the bonding is of the direct metal-to-metal type, and two interfaces, i.e., metal-melt and melt-metal, where melt pockets or regions are present. Regardless of the type of bond zone, there is substantially no diffusion across any interface at the bond zone in the as-bonded product.

Irrespective of the metals being bonded, the melted layer type of bond produces a product of high shear strength; and in metal systems which form ductile alloys, this type of bond gives a product also capable of being worked extensively. However, when brittle alloys or intermetallics are formed, a melted layer bond should be extremely thin (e.g., less than 10 microns and preferably less than one micron) if the product is to have the workability required by forming operations, and even then the cladding or prime metal layer must be relatively thin, e.g., less than about ⅛ inch. Consequently, as a rule, a high degree of direct metal-to-metal bonding with melt regions isolated from each other is preferred in metal systems which form brittle alloys or brittle intermetallic compounds. This is one reason why the wavy bond zone with a major proportion of the bonding consisting of the direct metal-to-metal type of bond is preferred. The wavy bond zone also generally is preferred over the substantially straight bond because of the larger interfacial area the wavy zone provides.

Coassigned, copending U.S. patent application Ser. No. 503,261, now Pat. No. 3,397,444, describes an improved method of carrying out the processes of U.S. Pats. 3,137,-937 and 3,264,731 so as to form clad products having a minimum amount of solidified melt at the bond zone, hence improved strength and ductility. According to this explosion-bonding process, the metal layers are initially spaced from each other at an angle less than 10°, and preferably at about 0°, and then caused to progressively collide at a certain impact angle and a velocity below that at which large amounts of solidified melt are produced at the interface, impact angles up to about 20° and collision velocities of about from 1400 to 2500 meters/sec. being exemplified. The products thus produced, including those wherein aluminum is bonded to steel, are bonded over at least 90% of each interface and have low melt content. It has been found, however, that the commercially important system, aluminum/steel, is unlike the other dissimilar metal combinations in two respects. First, in the usual situation where aluminum is driven into the layer of steel, decreasing collision velocity within the exemplified range of about from 2500 to 1400 meters/sec. does not increase the amount of direct aluminum-to-steel bond at impact angles up to about 20°. Second, the preferred wavy type bond wherein any interfacial melt is isolated between areas of direct metal-to-metal bond, cannot be produced between aluminum and steel at collision velocities below about 2500 meters/sec. when the aluminum is caused to collide with the steel at such impact angles.

Aluminum/steel clads are acquiring increased technical importance for use as transition joints in structural and electrical systems. Aluminum/steel structural transition joints, e.g., for marine and aerospace applications, must have high tensile strength and a high degree of ductility. In electrical transition joints, the highest possible conductivity across the aluminum/steel bond is desirable. Since aluminum and steel form intermetallic compounds which are brittle and offer substantially more resistance to the passage of electricity than direct aluminum-to-steel bond, it is readily seen that there is need for aluminum/steel clads wherein the bond has not only a low melt content but also a high percentage of direct aluminum-to-steel bond.

SUMMARY OF THE INVENTION

This invention provides an improvement in aluminum/steel composites wherein at least one layer of aluminum whose yield strength before bonding is up to about 17,000 p.s.i. and a layer of steel having a yield strength in the normalized condition of up to about 60,000 p.s.i. are bonded together over at least 90% of their interface by a substantially diffusionless metallurgical bond. The improvement resides in the metallurgical bond and constitutes a wavy bond that is at least about 70% direct aluminum-to-steel bond, the remainder being periodically spaced, discrete regions of solidified melt that are separated from each other by said direct bonding.

By "substantially diffusionless" it is meant that in the as-bonded condition, the interface and adjacent areas do not exhibit the gradient composition characteristic of diffusion-bonded products. Preferably, the as-bonded composites do not reveal diffusion across any interface when examined with an electron probe and by sectioning techniques having a 0.2 micron limit of resolution.

The "solidified melt" is a mixture of the parent metals, i.e., metals of the aluminum and steel layers, and their intermetallic compounds. The composition of this mixture is substantially uniform, i.e., it is of substantially homogeneous composition, throughout each melt pocket.

Also provided in accordance with this invention is an improved explosion-bonding process for producing the above new products. In particular, the improvement comprises effecting progressive collision of at least one aluminum layer whose yield strength is up to about 17,000 p.s.i. with a layer of steel whose yield strength in the normalized condition is up to about 60,000 p.s.i., at a collision velocity of about from 2500 to 3400 meters/sec. and an impact angle of about from 14 to 25°, the opposed surfaces of said layers being disposed at an angle of less than 5° prior to detonation of the explosive.

The collision velocity is the velocity with which the line or region of collision travels along the steel and aluminum layers to be bonded. The impact angle is the angle between the steel and aluminum layers on collision.

The term "aluminum" as used herein with reference to the metal layer bonded directly to the steel layer denotes pure aluminum as well as aluminum-base alloys containing at least 85% aluminum, by weight.

Unless otherwise specifically indicated, the term "steel" is used herein to denote carbon steel and low-alloy steels, i.e., alloy steels that contain less than about 5% alloying elements, by weight.

DESCRIPTION OF THE DRAWINGS

In the accompanying drawings which illustrate specific embodiments of this invention.

DETAILED DESCRIPTION OF THE INVENTION

According to the present process, a layer of aluminum having a yield strength of up to about 17,000 p.s.i. is metallurgically bonded to a layer of steel whose yield strength in the normalized condition is up to about 60,000 p.s.i. by explosively propelling the aluminum layer toward the steel layer so as to cause the aluminum and steel layers to collide progressively at a velocity of about from 2500 to 3400 meters per second and an impact angle of about from 14 to 25°. Carrying out the explosion bonding process in this particular collision velocity range at the specified impact angles and with the designated types of aluminum and steel produces at least 90% bonding by a substantially diffusionless wavy bond zone in which at least about 70% of the bonding is of the direct metal-to-metal type, i.e., at least about 70% of the bond area is a metal-to-metal interface, as contrasted to metal-to-solidified melt interfaces. By virtue of their high percentage of direct aluminum-to-steel bonding, the products of this invention exhibit a ductile type of failure in both shear and tension, and high resistance to shock loading as evidenced by the fact that they cannot be separated at the interface by a chisel. Hence, these products are capable of being worked extensively without failure at the bond zone.

Figure 1:
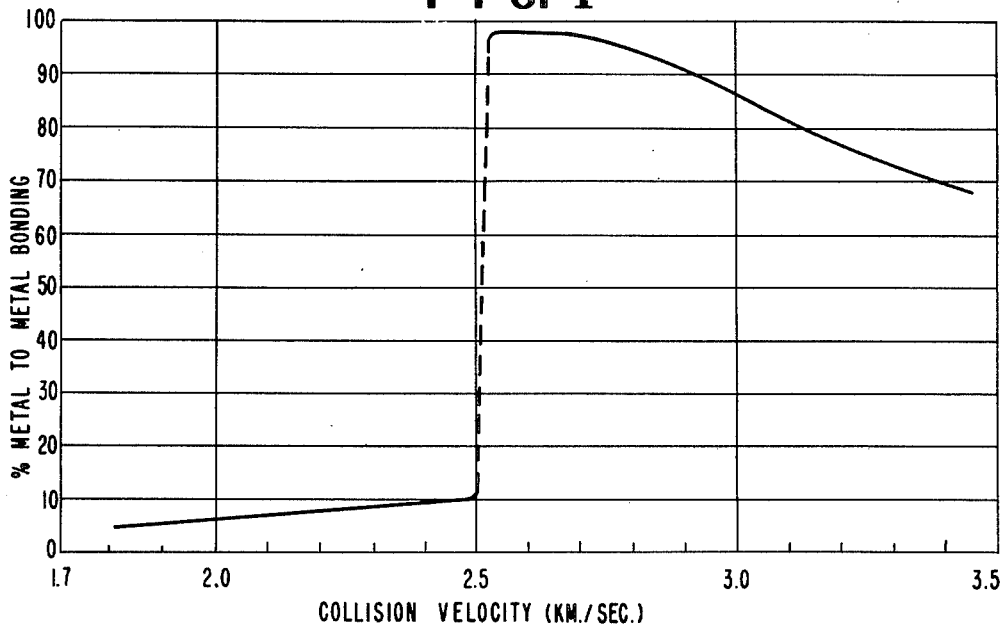
FIG. 1 is a plot of percent of direct metal-to-metal bonding in the interfacial area versus collision velocity for a typical aluminum/steel clad of this invention.
Figure 2:
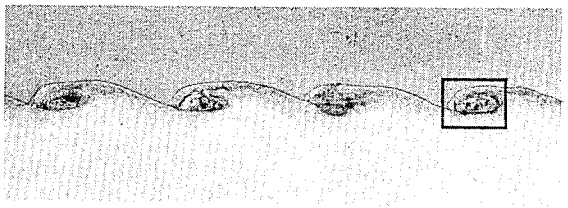
FIGS. 2 and 2A are photomicrographs at two different magnifications of a typical wavy bond zone obtained in aluminum/steel clads made by the process of this invention.
Figure 2A:
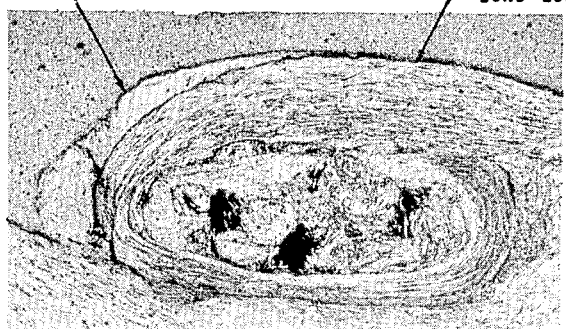

The manner in which the nature of the bonding varies with collision velocity in aluminum/steel explosion clads can be understood more clearly by reference to FIG. 1. The plot in FIG. 1 is representative of the results obtained when a 0.5-inch-thick layer of 1100–F aluminum is clad explosively to a 1.5-inch-thick layer of AISI–SAE–1008 steel, the metal layers initially being disposed substantially parallel to each other and with the standoff between them and the exposive load being such that a steady-state impact angle of about 18–20° is set up between the layers during bonding. In FIG. 1, the curve shown is drawn through points obtained by plotting collision velocity, i.e., detonation velocity of the explosive since the metal layers initially are substantially parallel, as the abscissa and percent direct metal-to-metal bonding obtained as the ordinate. Just at about 2500 meters per second, there is an abrupt rise in percent metal-to-metal bonding, associated with a transition from a substantially straight or irregular bond zone to a distinct wavy pattern. A bond zone characteristically obtained at about this velocity is shown in FIG. 2 which is a cross-sectional view (6.6×) normal to the surfaces of the clad composite and parallel to the direction of detonation travel, from right to left. FIG. 2A is a magnification of the boxed-in area of FIG. 2. The interface is the continuous wavy line between the aluminum layer (top) and steel layer (bottom). As best seen in FIG. 2A, a normal drawn through most points on the interface passes only through aluminum and steel, i.e., the bonding is metal-to-metal. At a few points, normals pass through aluminum, solidified melt and steel. Here the bonding is via the melt layer. A region of solidified melt is completely encapsulated by the overlapping steel layer and is not present at the interface. The percent metal-to-metal bonding defined herein is obtained by measuring the total length of the continuous wavy interface, and the lengths of the small sections of the interface which are aluminum/melt interfaces. The difference between the total length of the wavy interface and the sum of these section lengths, divided by the total length of the interface gives the percent metal-to-metal bonding.

The minimum collision velocity for wave formation increases slightly as impact angle decreases, i.e., the dotted transition line of FIG. 1 shifts to the right when the impact angle is reduced to below about 18–20°. As a rule, the minimum velocity for wave formation increases substantially linearly from about 2500 to about 2900 m./sec. as the impact angle decreases from about 20° to about 14°. Whatever impact angle is chosen, the collision velocity employed should be sufficient to cause wave formation.

At collision velocities near the minimum for wave formation, the amount of melt at the interface is at a minimum, and the percent metal-to-metal bonding at a maximum. At these velocities melt regions are nearly completely encapsulated in the steel layer by the overlapping waves. Under some circumstances the encapsulation is complete, and there may be no melt at the interface, e.g., the melt will not be observable at a magnification of 1000×. As the collision velocity is increased, the amount of melt at the interface increases until a velocity is reached, i.e., about 3400 m./sec., at which the percent metal-to-metal bonding no longer exceeds about 70%, as shown in FIG. 1. This maximum velocity remains about the same albeit the minimum velocity for wave formation may be above about 2500 m./sec. because as this minimum velocity increases so does the rate of melt formation with increasing collision velocity.

The collision velocity range of about from 2500 to 3400 m./sec. is employed for the aluminum/steel systems of this invention because it gives a high percentage of direct aluminum-to-steel bonding. This affords the best bond ductility. Also, since direct aluminum-to-steel bonding has substantially no measurable electrical resistance, it is important where the clad composites are to be employed in electrical systems, e.g. as transition joints. Whether strength or conductivity is the prime consideration, bonds containing at least about 90% direct aluminum-to-steel bonding are most desirable, and for this reason, the collision velocity preferably will not be far above the transition velocity for wave formation. For example, where this transition velocity is about 2500 m./sec., the collision velocity preferably will not exceed about 2900 m./sec. To ensure wave formation, the explosive preferably will be chosen so that the calculated collision velocity is at least about 100 meters/sec. higher than this transition velocity, thus making the preferred minimum velocity at least about 2600 m./sec.

Within the collision velocity region specified above, the aluminum and steel layers should collide at an impact angle sufficient to cause wave formation but not less than about 14°. Below this value, wave formation is difficult to obtain irrespective of the collision velocity employed. For a given thickness of the aluminum layer, the impact angle produced increases with increasing explosive loading, and increases with increasing initial standoff or angle to a maximum. Stated differently, impact angle increases with the aluminum displacement velocity and reaches a maximum with standoff. The maximum impact angle that will be employed is governed partly by the size of the waves desired, wave size increasing with increasing impact angle. Therefore, the maximum impact angle which should be used is the angle above which the amplitude of the waves formed is larger than desired. In addition, since wave size increases also with increasing collision velocity within the velocity range employed in the present process, for a fixed maximum desired wave size, the maximum impact angle which should be used decreases with increasing collision velocity. In any event, the impact angle should not exceed about 25° since higher angles often result in pronounced edge effects and irregular bond patterns, and tend to give melt regions of sufficient volume that they will have a significantly deleterious effect on bond strength, often because of solidification (voids) caused by shrinkage of the melt upon cooling. Best results are obtained when the steady state impact angle is about from 14 to 20°. Impact angles can be measured from framing camera sequences using a reflected grid-displacement technique. Such a technique is described by W. A. Allen and C. L. McCrary in Review of Scientific Instruments, Vol. 24, pages 165–171 (1953).

In general, to achieve the impact angles useful in the present process in the preferred parallel arrangement, an explosive loading weight of about 0.2 to 3 times the weight of the layer(s) to be driven is used, while a standoff of about from 1 to 6 times the driven layer's or layers' thickness is employed. Explosive loading weight is the weight per unit area of explosive material, exclusive of any non-explosive ingredients which may be present in a given explosive composition.

Aluminum may be clad to one side of a steel layer, or to both sides. Two outside aluminum layers may be clad onto the steel in two stages, or they can be propelled simultaneously toward the steel layer. Each aluminum layer that is to be bonded directly to the layer of steel is pure aluminum or an aluminum-base alloy containing at least 85% aluminum, by weight, and has a yield strength, measured before bonding, i.e., when the aluminum layer is ready for bonding, that does not exceed about 17,000 p.s.i. When an aluminum-base alloy is employed, the type of alloying elements is not critical however, aluminums containing less than 2.1% magnesium plus silicon, by weight, are preferred. Also, the aluminum layer(s) bonded to steel in the present process may be in the fully annealed, partially annealed or hardened condition, the important consideration being their yield strength just before bonding. Exemplary aluminums are those having the designations 1100–F, 3003–O, 5005–O, 5457–O and 6061–O (Aluminm Association numbers and temper designations). After bonding, i.e., in the as-bonded condition, the yield strength of the aluminum will be substantially higher than before bonding, primarily because of substantial work hardening at and adjacent the bond zone. Often, and particularly when the aluminum is at least about one-quarter inch thick, at least the outside surface of the aluminum layer will have a yield strength of about 17,000 p.s.i. or less. This yield strength is conveniently computed from Brinell hardness measurements taken on the aluminum's outside surface.

The yield strength of the steel layer, measured when it is in the normalized condition and before bonding will not exceed about 60,000 p.s.i. This layer will be carbon steel or low-alloy steel containing less than about 5% alloying elements by weight. The type of alloying elements is immaterial, the only requirement being that their quantity and the yield strength of the steel layer be within the above limits. The steel layer may be in the normalized or annealed condition at the time of cladding, but preferably is normalized. Sutiable steels include those having the ASTM designations A–212–B (A–516–GR55 to 70) and A204, and those having the SAE designations 1008 and 4620. As bonded, the actual yield strength of the steel layer will be substantially the same as that of the starting layer because work hardening is slight and is confined to a very narrow layer of steel, e.g. about 50 to 70 mils thick, at the bond zone. In the normalized condition, the product's steel layer will have a yield strength of up to about 60,000 p.s.i.

For two-layered products, the aluminum and steel layers to be bonded generally are at least about 0.125 inch thick, the bonding of thinner layers being feasible but not often in demand. For most applications, the steel layer will be at least about 0.5 inch thick. Also, as a practical matter, the thickness of an aluminum layer (i.e., a propelled layer) normally will not exceed about two inches.

When the starting aluminum and steel layers do not meet the foregoing requirements as to yield strength and composition, a wavy bond is difficult to form, and if formed, will contain too much solidified melt. The exact reason for this is unknown, but it is believed that the metals' resistance to wave formation causes heat generation, hence an increasing amount of melt when the limitations on amount of alloying elements and yield strength are exceeded. It is to be understood that these limitations apply to the steel and aluminum layers that are to be bonded directly to each other, and not to layers of different metals that may be bonded to the outside surface of the aluminum and/or steel layer. For example, one side of the steel layer can be bonded to a layer of aluminum meeting the above requirements while the other side of the steel layer is bonded to a layer of high-alloy steel, e.g., stainless steel; or, one side of the aluminum layer can be bonded to a layer of carbon or low-alloy steel, as defined above, and the other side to a layer of aluminum-base alloy whose yield strength exceeds about 17,000 p.s.i. In such cases, the three metal layers can be bonded together simultaneously, or any pair can be bonded first and a third subsequently bonded to the proper surface of the two-layered composite.

An additional requirement for wavy bond formation according to the process of this invention is that each aluminum layer which is to be bonded directly to the layer of steel be caused to progressively collide with the layer of steel. In other words, each such aluminum layer is explosively driven, either directly by the explosive itself or indirectly by means of an explosively propelled metal layer. This procedure not only gives the above-described low-melt-content wavy bonds at the collision velocities employed in the process of this invention, but usually also requires the least amount of explosive to obtain proper bonding conditions, since the mass of the aluminum layer per unit area normally is substantially less than that of the steel layer. Although the layer of steel can be driven, if desired, it is more practical to support the steel layer and explosively propel only the aluminum layer(s).

The metal layers can be arrayed initially parallel to, and spaced apart from, each other, or at an angle less than 5°. Higher angles are operable but normally give non-uniform bonds when commercial size metal layers are being clad. The substantially parallel arrangement is preferred, however, for reasons of easier operability and greater uniformity of the bond zone produced. A layer of detonating explosive is placed adjacent the metal layer(s) to be driven, and is initiated so that detonation is propagated substantially parallel to the surface of the adjacent metal layer. If the metal layers are initially parallel, the collision velocity equals the detonation velocity of the explosive, and an explosive having a detonation velocity in the range of about from 2500 to 3400 meters/sec. is employed. When the angle cladding technique is employed, explosives having higher detonation velocities can be used, since the required collision velocity can be achieved with explosives of higher detonation velocity by increasing initial angle and/or explosive load.

Typical explosive compositions useful in the present process are described in the aforementioned copending U.S. patent application Ser. No. 503,261, the disclosures of which are incorporated herein by reference. It is preferred to have the layer of explosive overhang each edge of the adjacent metal layer by a distance at least equal to twice, and usually less than about 4.5 times, the latter layer's thickness. This procedure substantially eliminates non-bonding at the edges, hence insures the maximum degree of bonding. It is particularly preferred to additionally employ edge-extension pieces on all edges of the aluminum layer to minimize thinning of its edges. These extension pieces should be of the same density and thickness as the aluminum layer and have a width about equal to the distance the explosive overhangs the driven layer.

The technique employed to initiate the explosive layer(s), support the cladding assembly, prepare the metal surfaces, and otherwise effect the bonding process are described in the aforementioned patents, the disclosures of which are incorporated herein by reference. Effective means of maintaining the standoff distance are described in U.S. Pat. 3,205,574 and copending U.S. patent application Ser. No. 587,299, now Pat. No. 3,360,848. Also, as in the processes described in the aforementioned patents and patent applications, the present process can be used to bond aluminum and steel layers of any shape, e.g., planar or tubular, thus to produce aluminum/steel clad products in such forms as plates, sheets, strip, rods, bars, tubing, etc. Clad composites wherein the layers have an interfacial area of at least about one square foot, and particularly planar products, are preferred commercially.

The aluminum/steel composites of this invention are useful as transition joints in structural and electrical systems in which aluminum components need to be joined to steel components. The use of such joints overcomes the problem of brittle intermetallic formation encountered in the fusion welding of aluminum to steel, since aluminum components of the system are welded to the aluminum portion of the transition joints and the steel components to the steel portion. Two-layered composites in which an aluminum layer having a yield strength (before bonding) of less than 17,000 p.s.i. is bonded to a carbon or low-alloy steel, e.g., 1100 or 5005 aluminum to 1008 steel or A–516–GR55, are suitable transition joints in certain electrical and structural applications. In systems in which the aluminum portion of the transition joint is to be welded to a component made of an aluminum alloy having a yield strength greater than 17,000 p.s.i., it may be desirable, to assure maximum weld strength, to employ a three-layered transition joint in which a high-strength aluminum alloy, e.g., a high-strength alloy of the 5000 series such as 5456 or 5083 aluminum, is bonded to the aluminum layer of the two-layered composite. In such cases, one may alternatively use a higher yield strength aluminum of this invention, e.g., 5454 or 5086, as the outer layer and a preferred aluminum, e.g., 1100–O or –F, as the interlayer. Transition joints in which a layer of different metal, e.g., stainless steel, is bonded to the steel layer of the two-layered composite, with or without a layer of different metal bonded to the aluminum layer, also are feasible.

A three-layered composite can be produced by explosion-bonding the three layers simultaneously under the conditions defined above, e.g., by positioning the layers at the selected initial standoff from each other and initiating a layer of explosive on the outside surface of the outermost aluminum layer. Alternatively, two layers can be bonded in one step, and the third bonded to the two-layered product in a second step. For example, to produce a composite in which an aluminum layer is sandwiched between a steel layer and a layer of higher-strength aluminum, the lower-strength aluminum can be bonded to the steel first under the conditions defined above, and the higher-strength aluminum bonded to the aluminum side of the resulting composite under conditions falling within a broader range than that described for aluminum/steel bonding, i.e., the conditions described in U.S. Pat. 3,137,-937. A collision velocity range of about from 1800 to 3200 meters per second is preferred for the latter step, however, to prevent the formation of solidification defects associated with the formation of large amounts of melt at the bond zone. In another embodiment, the two aluminum layers are bonded together first by any suitable method, e.g., explosion-bonding or roll-bonding, and then the surface of the lower-strength aluminum is bonded to the steel surface. The thicknesses of the layers can be as desired provided the aluminum layer which is bonded to the steel is at least above 0.03-inch thick to assure well-defined waves.

The composites can be used as transition joints in any required manner. As electrical transition joints, for example, they may be employed in aluminum reduction cells, e.g., between aluminum bus bars and steel cathode rods. A typical mode of use as structural transition joints in ship construction, for example, is in joining an aluminum superstructure to a steel deck, e.g., by welding the steel side of the joint to a steel coaming which is welded to the steel deck, and the aluminum side to the aluminum superstructure. Transition joints also can be employed to join steel deck fittings, e.g., bitts, to an aluminum deck. In railroad tank car structures, the transition joints may be used to join an aluminum tank to a steel chassis.

The following examples serve to illustrate specific embodiments of the process and products of this invention. However, they will be understood to be illustrative only and not as limiting the invention in any manner.

The collision velocity given is the measured detonation velocity of the explosive. The percent metal-to-metal bonding is determined as described above with reference to FIGS. 2 and 2A.

EXAMPLES 1–7

An 18" x 24" aluminum plate is clad to a supported 18" x 24" steel backer plate by positioning the aluminum plate over the backer with facing (opposed) surfaces parallel to each other at a standoff, positioning a layer of explosive on the outer aluminum surface, and point-initiating the explosive at the center of the short edge. In each example, edge-extension pieces of the same composition and thickness as the aluminum layer and having a width equal to four times its thickness are tack-welded to all four edges of the aluminum layer, and the layer of explosive covers both the aluminum layer and the extension pieces. The explosive composition is a granular mixture of 80/20 amatol (80% ammonium nitrate/20% trinitrotoluene) and 35 to 55% sodium chloride based on the total weight of the composition, the percentage of sodium chloride being adjusted within this range to give the designated collision velocities. The description of the metals, standoff, explosive loading, collision velocity, and impact angle employed, and the nature of the bond obtained are given in the following table. The yield strengths given for the aluminum and steel layers are their actual yield strengths before bonding. The steel layers are in the normalized condition and the aluminum layers have the temper indicated by their Aluminum Association designations. All products are bonded over more than 90% of the aluminum-steel interface, cannot be separated at the bond zone by a chisel, and exhibit a ductile type of failure. Their bonds have shear and tensile strengths above those of the weaker parent metal before cladding. Measurements of electrical resistance on bars cut from the clad products show that substantially no resistance is contributed by the bond zone.

The same type and degree of bonding is obtained when each of Examples 1 to 7 is repeated using the tabulated conditions, but with the aluminum layer at an angle of about 2° to the steel backer and separated therefrom at the closest point by a space equal to the exemplified standoff. Also, three-layered aluminum/steel/aluminum composites having the same type and degree of bonding are obtained by vertically arranging the steel layer and two of the aluminum layers with the steel layer in the middle, using an additional layer of the same explosive, i.e. adjacent the outside surface of the second aluminum layer, and simultaneously initiating the explosive layers at corresponding locations, when the conditions are otherwise the same as those illustrated in the foregoing examples.

ployed as transition joints in a structure simulating shipboard construction, steel being welded to steel and aluminum to aluminum without adverse effect on the bond zone.

We claim:
1. In the process for metallurgically bonding metal layers by propelling said layers together with an explosive, the improvement which comprises effecting progressive collision of at least one aluminum layer whose yield strength is up to about 17,000 p.s.i. with a layer of steel having a yield strength in the normalized condition of up to about 60,000 p.s.i., at a collision velocity of about from 2500 to 3400 meters/sec. and sufficient to cause wavy bond formation, at an impact angle of about from 14 to 25°, the opposed surfaces of said layers being disposed at an angle of less than 5° prior to detonation of said explosive.

2. A process of claim 1 wherein said layer of aluminum contains less than 2.1% magnesium plus silicon.

3. A process of claim 2 which comprises the additional step of bonding to one side of said aluminum layer, a layer of aluminum whose yield strength is above 17,000 p.s.i.

4. A process of claim 2 wherein said collision velocity is at least about 2600 meters/sec.

5. A process of claim 2 wherein the impact angle does not exceed about 20°.

6. A process of claim 2 wherein said aluminum layer is initially disposed substantially parallel to said layer of steel and is separated therefrom by a space of about from 1 to 6 times the thickness of the aluminum layer, and a layer of explosive is positioned on the outside surface of

| Ex. No. | Aluminum prime metal | | | Steel backer metal | | | Stand-off (in.) | Explosive loading[1] (lb./sq. ft.) | Collision velocity (m./sec.) | Impact angle (degrees) | Type of bond zone | Percent direct aluminum-steel bonding |
|---|---|---|---|---|---|---|---|---|---|---|---|---|
| | Type | Thickness (in.) | Yield strength (p.s.i.) | Type | Thickness (in.) | Yield strength (p.s.i.) | | | | | | |
| 1 | 1100-H12 | 0.5 | 12,000 | C 1008 | 1.5 | 32,000 | 1.5 | 15 | 2,520 | 18 | Wavy | 98 |
| 2 | 1100-H12 | 1.0 | 12,000 | C 1008 | 1.5 | 32,000 | 2.25 | 24 | 2,650 | 16 | do | 98 |
| 3 | 6061-O | 0.5 | 8,000 | C 1008 | 1.5 | 32,000 | 1.5 | 16 | 2,710 | 16 | do | 94 |
| 4 | 1100-H14 | 0.5 | 17,000 | C 1008 | 1.5 | 32,000 | 2.0 | 12 | 2,850 | 17.5 | do | 92 |
| 5 | 1100-H14 | 0.188 | 17,000 | A-212-B | 6.0 | 49,000 | 1.0 | 9 | 3,020 | 17.5 | do | 85 |
| 6 | 3003-O | 0.5 | 6,000 | C 1008 | 1.5 | 32,000 | 1.5 | 15 | 3,160 | 16 | do | 77 |
| 7 | 1100-H12 | 1.0 | 12,000 | C 1008 | 1.5 | 32,000 | 2.5 | 21 | 3,300 | 16.2 | do | 75 |

[1] Includes weight of the sodium chloride.  [2] A-516-Grade 70.

EXAMPLE 8

(a) A 16" x 32" 1100-H14 aluminum plate 0.25" thick is clad to an ASTM A-516-GR55 steel plate (yield strength 38,000 p.s.i.) measuring 16" x 32" and having a thickness of 0.5", by the procedure described in Examples 1-7. Collision velocity is 3060 meters per second, and impact angle is 19°. The composite produced is bonded over more than 90% of the interface by a wavy bond, the direct aluminum-steel bonding being about 85%. The product cannot be separated at the bond zone by a chisel, and exhibits a ductile type of failure. The shear and tensile strengths of the bonds are above those of the aluminum before bonding.

(b) A 16" x 32" 5456-H321 aluminum plate (yield strength 37,000 p.s.i.) 0.25" thick is clad to the aluminum layer of the composite formed as described in Step (a) above, using the same procedure. The collision velocity is 2230 meters per second and impact angle 12°. The aluminum layers are bonded over more than 90% of the interface by a wavy bond, which is ductile.

The three-layered composite from Step (b), as well as a two-layered composite of 0.5" aluminum bonded to 0.5" steel, prepared as described above in Step (a), are emthe aluminum layer, said explosive layer having a weight per unit area of about 0.2 to 3 times that of the aluminum layer and being of such dimensions that it overhangs each edge of the aluminum layer a distance equal to at least 2 times the aluminum layer's thickness.

7. A process of claim 6 wherein the impact angle is about from 14 to 20°.

8. A process of claim 7 wherein the detonation velocity of said explosive is at least about 2600 meters/sec.

References Cited

UNITED STATES PATENTS

| | | | |
|---|---|---|---|
| 3,137,937 | 6/1964 | Cowan et al. | 29—486 |
| 3,194,643 | 7/1965 | Ma et al. | 29—470.1X |
| 3,238,071 | 3/1966 | Holtzmann et al. | 29—486X |
| 3,264,731 | 8/1966 | Chudzik | 29—486 |
| 3,397,045 | 8/1968 | Winter | 29—194X |
| 3,397,444 | 8/1968 | Bergmann et al. | 29—470.1 |

JOHN F. CAMPBELL, Primary Examiner

R. J. SHORE, Assistant Examiner

U.S. Cl. X.R.

29—486